United States Patent
Watfa et al.

(10) Patent No.: US 12,538,249 B2
(45) Date of Patent: Jan. 27, 2026

(54) MULTI-USIM OPERATION IN USER EQUIPMENT

(71) Applicant: Samsung Electronics Co., Ltd., Gyeonggi-do (KR)

(72) Inventors: Mahmoud Watfa, Middlesex (GB); Lalith Kumar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 764 days.

(21) Appl. No.: 17/882,083

(22) Filed: Aug. 5, 2022

(65) Prior Publication Data

US 2023/0040747 A1  Feb. 9, 2023

(30) Foreign Application Priority Data

Aug. 6, 2021 (IN) .............................. 202131035582
Aug. 3, 2022 (GB) .................................... 2211284

(51) Int. Cl.
*H04W 88/06* (2009.01)
*H04W 60/00* (2009.01)

(52) U.S. Cl.
CPC ............ *H04W 60/00* (2013.01); *H04W 88/06* (2013.01)

(58) Field of Classification Search
CPC ..... H04W 60/00; H04W 88/06; H04W 8/183; H04W 76/30
See application file for complete search history.

(56) References Cited

U.S. PATENT DOCUMENTS

| | | | |
|---|---|---|---|
| 2014/0128110 A1* | 5/2014 | Wang | H04W 60/04 455/458 |
| 2017/0245188 A1 | 8/2017 | Kim et al. | |
| 2019/0014530 A1* | 1/2019 | Aghili | H04W 48/08 |
| 2020/0359196 A1 | 11/2020 | Balasubramaniam et al. | |
| 2021/0014822 A1 | 1/2021 | Gurumoorthy et al. | |

(Continued)

FOREIGN PATENT DOCUMENTS

| | | |
|---|---|---|
| WO | WO 2020/256489 | 12/2020 |
| WO | WO 2021/056384 | 4/2021 |
| WO | WO 2021/060893 | 4/2021 |

(Continued)

OTHER PUBLICATIONS

3GPP TS 24.501 V17.3.1, 3GPP, 3rd Generation Partnership Project; Technical Specification Group Core Network and Terminals; Non-Access-Stratum (NAS) Protocol for 5G System (5GS); Stage 3; (Release 17), Jun. 2021, 813 pages.

(Continued)

*Primary Examiner* — Rafael Pérez-Gutiérrez
*Assistant Examiner* — Gilbert M Grant
(74) *Attorney, Agent, or Firm* — The Farrell Law Firm, P.C.

(57) ABSTRACT

The disclosure relates to 5th generation (5G) and/or 6th generation (6G) communication system for supporting a higher data transmission rate. A method is provided of operating a user equipment (UE) with multi universal subscriber identity module (M-USIM) capability in a wireless communication system. The method includes performing a registration procedure with respect to a connected telecommunication network if the UE is in a non-allowed area and encounters or receives a trigger for a network access stratum (NAS) procedure related to an M-USIM feature.

16 Claims, 5 Drawing Sheets

(56) References Cited

U.S. PATENT DOCUMENTS

2022/0377613 A1\* 11/2022 Watfa ................ H04W 28/0908

FOREIGN PATENT DOCUMENTS

| WO | WO 2021/066562 | 4/2021 |
|---|---|---|
| WO | WO 2021/206322 | 10/2021 |

OTHER PUBLICATIONS

International Search Report dated Nov. 22, 2022 issued in counterpart application No. PCT/KR2022/011684, 7 pages.
British Search Report dated Dec. 22, 2022 issued in counterpart application No. GB 2211284.1, 6 pages.
British Search Report dated May 3, 2024 issued in counterpart application No. GB 2211284.1, 5 pages.
3GPP TS 24.501 V17.2.0 (Mar. 2021), Technical Specification, 758 pages.
3GPP TS 23.502 V17.0.0 (Mar. 2021), Technical Specification, 646 pages.
3GPP TS 23.501 V17.0.0 (Mar. 2021), Technical Specification, 489 pages.
3GPP TR 23.752 V0.5.0 (Sep. 2020), Technical Report, 162 pages.
Apple et al., "Updates to Service Request for MUSIM Leaving and Reject Paging in 5GS", CP-211322, 3GPP TSG-CT Meeting #92e, Jun. 14-16, 2021, 25 pages.
Samsung, "Handling of Wait Time during Resume Procedure", C1-198356, 3GPP TSG-CT WG1 Meeting #120, Oct. 7-11, 2019, 8 pages.
European Search Report dated Oct. 16, 2024 issued in counterpart application No. 22853556.3-1215, 12 pages.

\* cited by examiner

MULTI-USIM OPERATION IN USER EQUIPMENT

CROSS-REFERENCE TO RELATED APPLICATION(S)

This application is based on and claims priority under 35 U.S.C. § 119 to Indian Patent Application No. 202131035582, which was filed in the Indian Patent Office on Aug. 6, 2021, and United Kingdom Patent Application No. 2211284.1, which was filed in the United Kingdom Intellectual Property Office on Aug. 3, 2022, the entire content of each of which is incorporated herein by reference.

BACKGROUND

1. Field

The disclosure relates generally to the configuration and operation of a mobile device or User Equipment (UE) which has multi-USIM (M-USIM) capability and a universal subscriber identity module (USIM) as a universal mobile telecommunications service (UMTS) subscriber identify module serving as an identifier of the UE.

2. Description of Related Art

Fifth generation (5G) mobile communication technologies define broad frequency bands such that high transmission rates and new services are possible, and can be implemented not only in sub 6 GHz bands such as 3.5 GHz, but also in above 6 GHz bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates up to fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple-input and multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE Power Saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks. Accordingly, it is expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure provides a method of operating a UE with M-USIM capability in a wireless communication system, including performing a registration procedure with respect to a connected telecommunication network if the UE is located in a non-allowed area and encounters or receives a trigger for a network access stratum (NAS) procedure related to an M-USIM feature.

The UE additionally may verify that a timer is running which is intended to block the registration procedure if not related to MUSIM, if that the timer is running is verified, the timer is disregarded and, if that the timer is running is not verified, the registration procedure is blocked by the UE.

The timer may be one of a back off (BO) timer, T3446, and a Service Gap Control, SGC, timer, T3447.

Being in the non-allowed area may correspond with the UE being in a 5GMM-REGISTERED.NON-ALLOWED-SERVICE state.

The MUSIM feature may be one of connection release, paging cause indication, reject paging request, paging restriction and delete stored paging restrictions information.

If the UE encounters or receives the trigger for the NAS procedure related to the MUSIM feature, and there is a timer running which is intended to block the NAS procedure if not related to MUSIM, if that the timer is running is verified, the timer may be disregarded and, if that the timer is running is not verified, the NAS procedure may be blocked by the UE.

The NAS procedure may be a service request procedure.

The timer may be one of a back off (BO) timer, T3446, and a Service Gap Control, SGC, timer, T3447.

The MUSIM feature may be one of connection release, paging cause indication, reject paging request, paging restriction and delete stored paging restrictions information.

The UE may be S1 and or N1 mode.

Another aspect of the disclosure provides a UE with M-USIM capability in a wireless communication system, with UE including a transceiver and at least one processor that is coupled with the transceiver and configured to, if the UE is located in a non-allowed area and encounters or receives a trigger for a NAS procedure related to an M-USIM feature, perform a registration procedure with respect to a connected telecommunication network.

The at least one processor may be configured to additionally verify that a timer is running which is intended to block the registration procedure if not related to MUSIM, if that the timer is running is verified, the timer is disregarded and, if that the timer is running is not verified, the registration procedure is blocked by the UE.

The timer may be one of a back off (BO) timer, T3446, and a Service Gap Control, SGC, timer, T3447.

Being in the non-allowed area may correspond with the UE being in a 5GMM-REGISTERED.NON-ALLOWED-SERVICE state.

The MUSIM feature may be one of connection release, paging cause indication, reject paging request, paging restriction and delete stored paging restrictions information.

If the UE encounters or receives the trigger for the NAS procedure related to the MUSIM feature, and there is a timer running which is intended to block the NAS procedure if not related to MUSIM, if that the timer is running is verified, the timer may be disregarded and, if that the timer is running is not verified, the NAS procedure may be blocked by the UE.

The NAS procedure may be a service request procedure.

The timer may be one of a back off (BO) timer, T3446, and a Service Gap Control, SGC, timer, T3447.

The MUSIM feature may be one of connection release, paging cause indication, reject paging request, paging restriction and delete stored paging restrictions information.

The UE may be S1 and or N1 mode.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
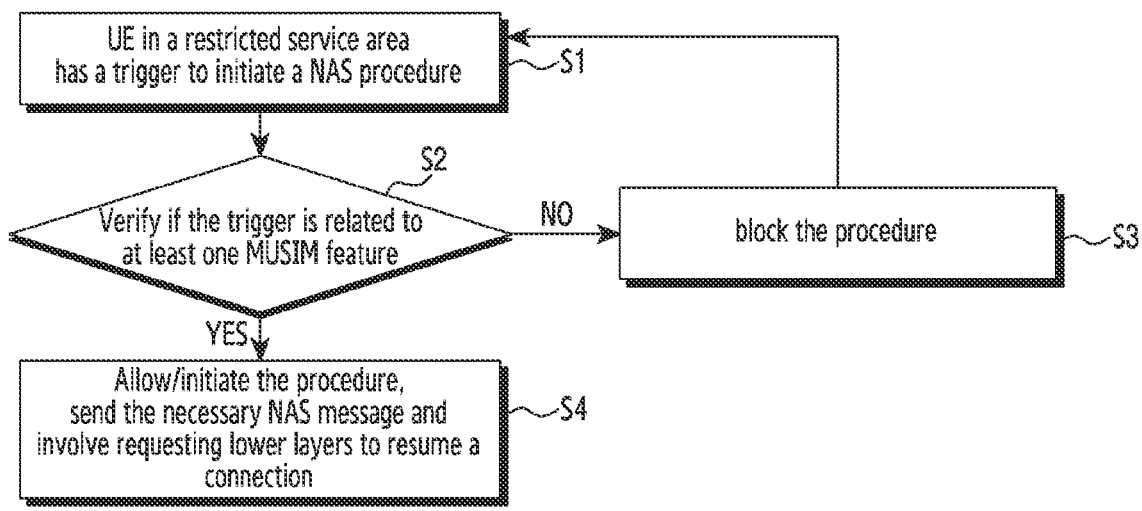
FIG. 1 illustrates a NAS procedure for UE behavior.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

The term couple refers to any direct or indirect communication between two or more elements, whether or not those elements are in physical contact with one another. The terms transmit, receive, and communicate encompass both direct and indirect communication. The terms include and comprise, mean inclusion without limitation. The term or is inclusive, meaning and/or. The term controller means any device, system or part thereof that controls at least one operation. A controller can be implemented in hardware or a combination of hardware and software and/or firmware. The functionality associated with any particular controller can be centralized or distributed, whether locally or remotely. At least one of, when used with a list of items, means that different combinations of one or more of the listed items can be used, and only one item in the list can be needed. For example, at least one of A, B, and C includes any of the following combinations: A, B, and C; A and B; A and C; B and C; and A and B and C. For example, at least one of A, B, or C includes any of the following combinations: A, B, and C; A and B; A and C; B and C; and A and B and C.

Moreover, various functions described below can be implemented or supported by one or more computer programs, each of which is formed from computer readable program code and embodied in a computer readable medium. The terms application and program refer to one or more computer programs, software components, sets of instructions, procedures, functions, objects, classes, instances, related data, or a portion thereof adapted for implementation in a suitable computer readable program code. The phrase computer readable program code includes any type of computer code, including source code, object code, and executable code. The phrase computer readable medium includes any type of medium capable of being accessed by a computer, such as read-only memory (ROM), random access memory (RAM), a hard disk drive, a compact disc (CD), a digital video disc (DVD), or any other type of memory. A non-transitory computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Terms used herein to describe the embodiments of the present disclosure are not intended to limit and/or define the scope of the present disclosure. For example, unless otherwise defined, the technical terms or scientific terms used in the present disclosure shall have the ordinary meaning understood by those with ordinary skills in the art to which the present disclosure belongs.

It should be understood that first, second and similar words used in the present disclosure do not express any order, quantity or importance, but are only used to distinguish different components. Unless otherwise indicated by the context clearly, similar words such as a, an, or the in a singular form do not express a limitation of quantity, but express an existence of at least one.

As used herein, any reference to one example or example, or one embodiment or embodiment means that particular elements, features, structures or characteristics described in connection with the embodiment are included in at least one embodiment. The phrases in one embodiment or in one example appearing in different places of the disclosure do not necessarily refer to the same embodiment.

The various embodiments discussed below for describing the principles of the present disclosure are for illustration only and should not be interpreted as limiting the scope of the present disclosure in any way. Those skilled in the art will understand that the principles of the present disclosure can be implemented in any suitably arranged wireless communication system. For example, although the following detailed description of the embodiments of the present disclosure will be directed to LTE and 5G communication system, those skilled in the art can understand that the main points of the present disclosure can also be applied to other communication systems with similar technical backgrounds and channel formats with slight modifications without departing from the scope of the present disclosure. For example, the communication systems may include a global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD), UMTS, worldwide interoperability for microwave access (WiMAX) communication system, a 5G system or new radio (NR), etc. In addition, the technical schemes of the embodiments of the application can be applied to future-oriented communication technologies.

An M-USIM UE is a UE that supports more than one USIM and hence can be simultaneously registered to multiple public land mobile networks (PLMNs). When this is the case, the multiple registrations can lead to the UE switching between the PLMNs for the purpose of getting a particular service, e.g., voice service. The UE can send some information to a serving network (e.g., an access and mobility management function (AMF) of the network) which helps determine the UE's preferences with respect to M-USIM operations. For example, the UE may send a paging restriction to inform the network about whether the UE would prefer to be paged, or whether paging should be restricted for all or some services, etc.

The description of some relevant M-USIM features is shown below, from 3GPP TR 23.752 V0.5.0. As used herein, M-USIM feature relates to, or can refer to, any of a connection release, a paging cause indication, a reject paging request, or a paging restriction, and any combination of these features.

5.38 Support for Multi-USIM UE
5.38.1 General

A network and a UE may support one or more of the following enhancements for Multi-USIM UE operation:
Connection release as described in clause 5.38.2;
Paging Cause Indication for Voice Service, as described in clause 5.38.3;
Reject paging request, as described in clause 5.38.4;
Paging Restriction, as described in clause 5.38.5.

In the Registration procedure (as specified in clause 4.2.2.2.2), when a Multi-USIM UE has more than one USIM active, supports and intends to use one or more Multi-USIM specific features, it indicates to the AMF the corresponding Multi-USIM feature(s) are supported. Based on the received indication of supported Multi-USIM features from the UE, the AMF shall indicate to the UE the support of the Multi-USIM features based on the Multi-USIM features supported by network and any preference policy by the network, if available. When a UE turns to have only one USIM active from a Multi-USIM UE that previously indicated to the network for the USIM with supported Multi-USIM feature(s), the UE shall indicate all the Multi-USIM features are not supported to the network for the USIM. The AMF shall indicate the support of Paging Restriction feature together with the support of either Connection Release feature or Reject Paging feature.

The Multi-MUSIM UE includes the support of individual features for Connection release, Paging Cause Indication for Voice Service, Reject paging request and Paging Restriction as specified in clause 5.4.4a.

A Multi-USIM UE shall use a separate PEI for each USIM when it registers to the network.

5.38.2 Connection Release

A Multi-USIM UE may request the network to release the UE from RRC-CONNECTED state for a USIM due to activity on another USIM, if both UE and network indicate this feature is supported to each other.

The UE indicates that it requests to be released from RRC-CONNECTED state, by initiating either a Service Request procedure or a Registration procedure (in case the UE needs to perform Registration Update at the same time with this network), including a Release Indication. If supported by the UE, the UE may also provide, only together with the Release Indication, a Paging Restriction Information, as specified in clause 5.38.5, which requests the network to restrict paging. The Paging Restriction Information from the UE is stored in the UE context in the AMF. If no Paging Restriction Information is provided in the Service Request or the Registration Request, any stored Paging Restriction Information in the UE context is removed.

When the UE initiates a Service Request procedure or Registration procedure without providing a Release Indication, the network removes any stored Paging Restriction Information.

When there is no PLMN-wide support for the Connection Release feature, it can occur that upon mobility update with Connection Release request the UE is not released by the network. The UE behaviour, when it detects that the network does not support the feature in a new RA, is outside the scope of this specification.

It is for further study (FFS) if the connection release is performed via access stratum (AS) procedure for NR connects to SGC.

5.38.3 Paging Cause Indication for Voice Service

The UE and the network may support Paging Cause Indication for Voice Service feature.

The network that supports Paging Cause Indication for Voice Service feature shall provide a Voice Service Indication for IMS voice service in the Paging message, only if the UE indicates the Paging Cause Indication for Voice Service feature is supported to the network. The network determines the IMS voice service based on the Paging Policy Indicator as specified in clause 5.4.3.2.

Upon reception of the Voice Service Indication in NGAP Paging Message from AMF, the NG-RAN supporting Paging Cause Indication for Voice Service should include the Voice Service Indication in the Uu Paging message to the UE.

When the UE context indicates Paging Cause Indication for Voice Service feature is supported, in order to require NG RAN to deliver the Voice Service Indication in RAN paging for UE in RRC-Inactive state, the AMF provides an indication indicating the Paging Cause Indication for Voice Service feature is supported to the NG-RAN. Upon reception the indication, the NG-RAN supporting the Paging Cause Indication for Voice Service indication feature stores it into the UE context. For a UE in RRC-Inactive, the NG-RAN should provide the Voice Service Indication in the RAN Paging message only when there is Paging Cause Indication for Voice Service indication in the UE context and detects the downlink data which triggers the RAN Paging message is related to voice service based on the Paging Policy Indicator, in the header of the received downlink data, as specified in clause 5.4.3.2.

UE that supports the Paging Cause Indication for Voice Service feature is capable of differentiation between Paging from a network that does not support the Paging Cause Indication for Voice Service feature and Paging without the Voice Service Indication.

Editor's note: How the UE can distinguish the Paging from a network that does not support the Paging Cause Indication for Voice Service feature and Paging without the Voice Service Indication depends upon RAN's decision.

5.38.4 Reject Paging Request

A Multi-USIM UE may setup connection to respond to a page with a Reject Paging Indication to the network indicating that the UE does not accept the paging and requests to return to CM-IDLE state after sending this response, if both UE and network indicate this feature is supported to each other.

Upon being paged by the network, the Multi-USIM UE in CM-IDLE state attempts to send a Service Request message to this network including the Reject Paging Indication, unless it is unable to do so, e.g. due to UE implementation constraints. In addition to the Reject Paging Indication, the UE may include Paging Restriction Information as specified in clause 5.38.5 in the Service Request message, if supported by UE.

5.38.5 Paging Restriction

The UE and the network may support Paging Restriction. The UE, if the AMF indicates that the network supports Paging Restriction feature, may indicate Paging Restriction Information in the Service Request or Registration Request message as specified in clauses 5.38.2 and 5.38.4. The Paging Restriction Information may indicate any of the following:

a) all paging is restricted; or
b) all paging is restricted, except paging for voice service (IMS voice); or
c) all paging is restricted, except for certain PDU Session (s); or
d) all paging is restricted, except paging for voice service (IMS voice) and certain PDU session(s).

The UE expects not to be paged for any purpose in case a). The UE expects to be paged only for voice service in case b). The UE expects to be paged only for certain PDU Session(s) in case c). The UE expects to be paged for voice service and certain PDU session(s) in case d).

In the case of roaming, the Paging Restrictions for voice service implied by bullet b) and d) depends on the existence of an agreement with the HPLMN to support voice service via IMS. Hence the support of paging restrictions in bullets b) and d) takes the IMS voice service agreement into consideration."

Other details regarding the UE behaviour with respect to the MUSIM feature can be found in TS 24.501.

The detailed UE behaviour when it is in a restricted service area is shown below from 3GPP TS 23.501:

"The service area restrictions consist of tracking areas forming either an allowed area, or a non-allowed area. The tracking areas belong to either the registered PLMN or its equivalent PLMNs in the registration area. The allowed area can contain up to 16 tracking areas or include all tracking areas in the registered PLMN and its equivalent PLMN(s) in the registration area. The non-allowed area can contain up to 16 tracking areas. The network conveys the service area restrictions to the UE by including either an allowed area, or a non-allowed area, but not both, in the Service area list IE of a REGISTRATION ACCEPT message or a CONFIGURATION UPDATE COMMAND message.

If the network does not convey the service area restrictions to the UE in the Service area list IE of a REGISTRATION ACCEPT message, the UE shall treat all tracking areas in the registered PLMN and its equivalent PLMN(s) in the registration area as allowed area and delete the stored list of "allowed tracking areas" or the stored list of "non-allowed tracking areas".

When the UE receives a Service area list IE with an allowed area indication during a registration procedure or a generic UE configuration update procedure:

a) if the "Type of list" included in the Service area list IE does not indicate "all TAIs belonging to the PLMNs in the registration area are allowed area", the UE shall delete the old list of "allowed tracking areas" and store the tracking areas in the allowed area as the list of "allowed tracking areas". If the UE has a stored list of "non-allowed tracking areas", the UE shall delete that list; or
b) if the "Type of list" included in the Service area list IE indicates "all TAIs belonging to the PLMNs in the registration area are allowed area", the UE shall treat all tracking areas in the registered PLMN and its equivalent PLMN(s) as allowed area and delete the stored list of "allowed tracking areas" or the stored list of "non-allowed tracking areas".

When the UE receives a Service area list IE with a non-allowed area indication during a registration procedure or a generic UE configuration update procedure, the UE shall delete the old list of "non-allowed tracking areas" and store the tracking areas in the non-allowed area as the list of "non-allowed tracking areas". If the UE has a stored list of "allowed tracking areas", the UE shall delete that list.

If the UE is successfully registered to a PLMN and has a stored list of "allowed tracking areas":

a) while camped on a cell whose TAI is in the list of "allowed tracking areas", the UE shall stay in, or enter, the state 5GMM-REGISTERED.NORMAL-SERVICE and is allowed to initiate any 5GMM and 5GSM procedures; and b) while camped on a cell which is in the registered PLMN or a PLMN from the list of equivalent PLMNs and whose TAI is not in the list of "allowed tracking areas", the UE shall enter the state 5GMM-REGISTERED.NON-ALLOWED-SERVICE, and:

1) if the UE is in 5GMM-IDLE mode or 5GMM-IDLE mode with suspend indication over 3GPP access, the UE:

i) shall not include the Uplink data status IE in the registration procedure for mobility and periodic registration update except for emergency services or for high priority access;

ii) shall not perform the registration procedure for mobility and periodic registration update with Follow-on request indicator set to "Follow-on request pending", except for:
  emergency services;
  high priority access;
  indicating a change of 3GPP PS data off UE status;
  sending an SOR transparent container;
  sending a UE policy container; or
  sending a UE parameters update transparent container;

iii) shall not initiate a service request procedure or request the lower layers to resume a suspended connection, except for:
  emergency services;
  emergency services fallback;
  high priority access;
  responding to paging;
  responding to notification received over non-3GPP access;
  indicating a change of 3GPP PS data off UE status;
  sending an SOR transparent container;
  sending a UE policy container; or
  sending a UE parameters update transparent container; and 2) if the UE is in 5GMM-CONNECTED mode or 5GMM-CONNECTED mode with RRC inactive indication over 3GPP access, the UE:

i) shall not perform the registration procedure for mobility and periodic registration update with Uplink data status IE except for emergency services or for high priority access;

ii) shall not initiate a service request procedure except for:
  emergency services;
  emergency services fallback;
  high priority access;
  responding to paging or responding to notification received over non-3GPP access;

iii) shall not initiate a 5GSM procedure except for:
  emergency services;
  high priority access; or
  indicating a change of 3GPP PS data off UE status; and iv) shall not perform the NAS transport procedure except for the sending:
  SMS;
  an LPP message;
  a location services message;
  an SOR transparent container;
  a UE policy container;
  a UE parameters update transparent container; or
  a CIoT user data container.

NOTE 1: The contents of CIoT user data container can be data that is not for exception reports, or data that is for exception reports if allowed for the UE (see subclause 6.2.13).

If the UE is successfully registered to a PLMN and has a stored list of "non-allowed tracking areas":

a) while camped on a cell which is in the registered PLMN or a PLMN from the list of equivalent PLMNs and whose TAI is not in the list of "non-allowed tracking areas", the UE shall stay in, or enter, the state 5GMM-REGISTERED.NORMAL-SERVICE and is allowed to initiate any 5GMM and 5GSM procedures; and b) while camped on a cell whose TAI is in the list of "non-allowed tracking areas", the UE shall enter the state 5GMM-REGISTERED.NON-ALLOWED-SERVICE, and:

1) if the UE is in 5GMM-IDLE mode or 5GMM-IDLE mode with suspend indication over 3GPP access, the UE:

i) shall not include the Uplink data status IE in the registration procedure for mobility and periodic registration update except for emergency services or for high priority access;

ii) shall not perform the registration procedure for mobility and periodic registration update with Follow-on request indicator set to "Follow-on request pending", except for:
  emergency services;
  high priority access;
  indicating a change of 3GPP PS data off UE status;
  sending an SOR transparent container;
  sending a UE policy container; or
  sending a UE parameters update transparent container; and iii) shall not initiate a service request procedure or request the lower layers to resume a suspended connection, except for:
  emergency services;
  emergency services fallback;
  high priority access;
  responding to paging;
  responding to notification received over non-3GPP access;
  indicating a change of 3GPP PS data off UE status;
  sending an SOR transparent container;
  sending a UE policy container; or
  sending a UE parameters update transparent container; and 2) if the UE is in 5GMM-CONNECTED mode or 5GMM-CONNECTED mode with RRC inactive indication over 3GPP access, the UE:

i) shall not perform the registration procedure for mobility and registration update with the Uplink data status IE except for emergency services or for high priority access;

ii) shall not initiate a service request procedure or request the lower layers to resume a suspended connection, except for:
  emergency services;
  emergency services fallback;
  high priority access; or
  responding to paging or responding to notification received over non-3GPP access;
iii) shall not initiate a 5GSM procedure except for:
  emergency services;
  high priority access; or
  indicating a change of 3GPP PS data off UE status; and
iv) shall not perform the NAS transport procedure except for the sending:
  SMS;
  an LPP message;
  a location services message;
  an SOR transparent container;
  a UE policy container;
  a UE parameters update transparent container; or
  a CIoT user data container.
    The contents of CIoT user data container can be data that is not for exception reports, or data that is for exception reports if allowed for the UE (see subclause 6.2.13).
    The list of "allowed tracking areas", as well as the list of "non-allowed tracking areas" shall be erased when:
a) the UE is switched off; and
b) the UICC containing the USIM is removed or an entry of the "list of subscriber data" with the SNPN identity of the SNPN is updated.
When a tracking area is added to the list of "5GS forbidden tracking areas for roaming" or to the list of "5GS forbidden tracking areas for regional provision of service" as specified in the subclauses 5.5.1.2.5 or 5.5.1.3.5, the tracking area shall be removed from the list of "allowed tracking areas" if the tracking area is already present in the list of "allowed tracking areas" and from the list of "non-allowed tracking areas" if the tracking area is already present in the list of "non-allowed tracking areas"."

As can be seen from the above, the UE in a non-allowed area is restricted from initiating a service request procedure except in response to paging, or for emergency services, or if the UE is a high priority UE.

The specification in 3GPP TS 23.501 defines the handling of NAS congestion at both the mobility management and the session management levels. The following is specified in 3GPP TS 23.501 about congestion handling on the mobility management level:

"5.3.9 Handling of NAS Level Mobility Management Congestion Control

The AMF may detect 5GMM signalling congestion and perform general NAS level congestion control. Under the 5GMM signalling congestion conditions the AMF may reject 5GMM signalling requests from UEs as specified in 3GPP TS 23.501 [8]. The AMF should not reject the following:
a) requests for emergency services;
b) requests for emergency services fallback;
c) requests from UEs configured for high priority access in selected PLMN;
d) DEREGISTRATION REQUEST message;
e) requests for mobile terminated services, triggered by paging or a notification procedure; and
f) requests for initial registration or mobility and periodic registration update, when emergency is indicated by lower layers.

When general NAS level congestion control is active, the AMF may include a value for the mobility management back-off timer T3346 in the reject messages. The UE starts the timer T3346 with the value received in the 5GMM reject messages. To avoid that large numbers of UEs simultaneously initiate deferred requests, the AMF should select the value for the timer T3346 for the rejected UEs so that timeouts are not synchronised.

If the UE is registered in the same PLMN over the 3GPP access and non-3GPP access, and the UE receives the timer T3346 from the AMF, the timer T3346 shall apply to both 3GPP access and non-3GPP access.

If the UE receives the paging message or NOTIFICATION message when timer T3346 is running and the UE is registered to the same PLMN over 3GPP access and non-3GPP access, the UE shall stop the timer T3346 for both accesses and respond to the paging message or NOTIFICATION message as specified in subclause 5.6.2 and subclause 5.6.3.

As an implementation option, MUSIM-capable UE is allowed to not respond to paging based on the information available in the paging message, e.g. voice service indication.

If the timer T3346 is running when the UE enters state 5GMM-DEREGISTERED, the UE remains switched on, and the USIM in the UE remains the same, then the timer T3346 is kept running until it expires or it is stopped.

If the UE is switched off when the timer T3346 is running, the UE shall behave as follows when the UE is switched on and the USIM in the UE remains the same:
let t1 be the time remaining for T3346 timeout at switch off and let t be the time elapsed between switch off and switch on. If t1 is greater than t, then the timer shall be restarted with the value t1−t. If t1 is equal to or less than t, then the timer need not be restarted. If the UE is not capable of determining t, then the UE shall restart the timer with the value t1.

If the UE enters a new PLMN while timer T3346 is running, and the new PLMN is not equivalent to the PLMN where the UE started timer T3346, the UE shall stop timer T3346 when initiating 5GMM procedures in the new PLMN.

After a change in registration area, if the timer T3346 is running and 5GS update status is 5U1 UPDATED then the UE shall set the 5GS update status to 5U2 NOT UPDATED and enter state 5GMM-REGISTERED.ATTEMPTING-REGISTRATION-UPDATE.

If timer T3346 is running or is deactivated, and the UE is a UE configured for high priority access in selected PLMN, or the UE needs to initiate signalling for emergency services or emergency services fallback, then the UE is allowed to initiate 5GMM procedures.

UE can, based on implementation, restrict lower layers of non-3GPP access from establishing access stratum connection on a registered PLMN when timer T3346 is running for the same PLMN."

When the NAS back-off (BO) timer is running, the UE is not allowed to initiate a procedure e.g. service request, unless if the procedure is triggered by certain events such as a need to request emergency services.

Service gap control is (SGC) is a feature that enables the network to control the frequency of mobile originated (MO) requests for the purpose of sending data. The network uses a SGC timer which determines the duration of time between consecutive MO requests. For example, after the UE registers with the network, the network may provide a SGC timer to the UE. The UE starts the timer after it transitions from 5GMM-CONNECTED mode to 5GMM-IDLE mode, after which the UE is not permitted to perform MO requests except for certain exceptions.

However, when the timer expires, the UE can transition from 5GMM-IDLE mode to 5GMM-CONNECTED mode for MO data transfer.

The following is specified in 3GPP TS 23.501 about SGC: "Service gap control (SGC) only applies to 3GPP access.

The network may control the frequency with which UEs can transition from 5GMM-IDLE mode to 5GMM-CONNECTED mode via the SGC as specified in 3GPP TS 23.501 [8] and 3GPP TS 23.502 [9]. If the network supports SGC and the service gap time value i.e. T3447 value is available in the 5GMM context of the UE, the AMF shall consider SGC as active for the UE.

The UE and the network negotiate usage of SGC during the registration procedure for initial registration and registration procedure for mobility and periodic registration update:
    the UE supporting SGC indicates its support in the REGISTRATION REQUEST message. If the UE supports SGC and the SGC is active for the UE, the AMF includes T3447 value IE in the REGISTRATION ACCEPT message (see subclause 5.5.1.2 and subclause 5.5.1.3). The UE stores the T3447 value; and
    for UEs that do not support SGC when the network rejects mobility management signalling requests because SGC is active in the network, the mechanism for general NAS level mobility management congestion control as specified in subclause 5.3.9 applies.

The network can provide a new T3447 value to the UE to be used next time it is started or stop timer T3447 in the UE if running with the Generic UE configuration update procedure as specified in subclause 5.4.4.

The UE shall start timer T3447 when the N1 NAS signalling connection is released and if:
    the UE supports SGC, and the T3447 value is available in the UE and does not indicate zero; and
    the N1 NAS signalling connection released was not established for:
    paging;
    registration procedure for initial registration with Follow-on request indicator set to "No follow-on request pending";
    registration procedure for mobility and periodic registration update with Follow-on request indicator set to "No follow-on request pending" and without Uplink data status IE included;
    requests for emergency services; or
    requests for exception data reporting.

If the SGC is active in the network, after the UE transitions from 5GMM-CONNECTED mode to 5GMM-IDLE mode except when the UE was in 5GMM-CONNECTED mode due to:
    paging;
    registration procedure for initial registration with Follow-on request indicator set to "No follow-on request pending";
    registration procedure for mobility and periodic registration update with Follow-on request indicator set to "No follow-on request pending" and without Uplink data status IE included,
    requests for emergency services; or
    requests for exception data reporting, The network shall start timer T3447 if not already running:
    with the T3447 value available in the 5GMM context minus 4 minutes, if the UE supports SGC and the T3447 value has been sent to the UE with a non-zero value; or
    with the T3447 value available in the 5GMM context if the UE does not support SGC.

When timer T3447 is running, the network allows:
    requests for emergency service;
    requests for emergency services fallback;
    requests for high priority access;
    requests for exception data reporting;
    registration procedure for initial registration with Follow-on request indicator set to "No follow-on request pending";
    registration procedure for mobility and periodic registration update without Uplink data status IE included and with Follow-on request indicator set to "No follow-on request pending"; or
    service request procedure or registration procedure for mobility and periodic registration update triggered by paging and subsequent MO signalling or MO data, if any, until the UE enters 5GMM-IDLE mode.

The UE or the network with a running T3447 timer keeps the timer running when the UE transits from 5GMM-IDLE mode to 5GMM-CONNECTED mode."

From the above, it can be concluded that when the SGC timer (i.e. T3447) expires and the UE goes to connected mode for MO data or signalling, the UE will start T3447 upon transition to idle mode again.

A first issue with the conventional systems relates to an M-USIM feature when the UE is located in a restricted service area. This M-USIM feature requires the UE to communicate with the network for its correct operations. For example, the UE sends the service request message to set the desired paging restrictions which directly impact paging. Hence, user experience service delays. As such, it is important for the UE to be able to communicate the necessary parameters, as soon as the parameters become available, e.g., based on the user's preferences, with the network so that the services can be obtained with minimal impact on the user's experience and minimal service delays.

Regarding this problem, when the UE is located in a restricted area, the UE is currently restricted from initiating a service request procedure except for emergency services, etc. As the current exceptions do not include the M-USIM feature, the UE will not be able to set its preferred paging restrictions or delete the stored paging restrictions (also referred to as paging restriction information), thereby negatively impacting the user's experience when the UE is in a restricted service area.

A second issue with the conventional systems relates to NAS congestion. The UE may have a 5GMM BO timer running due to congestion in the network. While the timer is running, the UE is prohibited from sending NAS messages to the network except if there is a need to request emergency services. This also negatively impacts the user's experience, since there is no exception that has been defined for M-USIM. For example, when the 5GMM BO timer is running, the UE will not be able to set its preferences for M-USIM or delete the stored paging restrictions (also referred to as paging restriction information), thereby negatively impacting the user's experience.

A third issue with the conventional systems relates to service gap control. The UE with a running SGC timer will be allowed to perform certain procedures, as listed earlier. For example, the AMF will allow some procedures that are initiated by the UE even though the SGC timer is running. However, the list of procedures that are not to be rejected by the AMF does not include the service request procedure, or the registration procedure, with M-USIM related parameters. As such, if the UE with a SGC timer attempts to, for example, provide a new paging restriction information or to delete the stored paging restrictions (also referred to as paging restriction information), then the AMF will reject the request from the UE. This negatively impacts the user's experience, as mobile terminated requests will be impacted since the UE's most up to date paging restrictions cannot be provided or deleted from the network.

According to a first aspect of the present invention, there is provided a method of operating a User Equipment, UE, with MUSIM capability, wherein if the UE is in a non-allowed area and encounters or receives a trigger for a Network Access Stratum, NAS procedure related to a MUSIM feature, then the UE performs a Registration procedure with respect to a connected telecommunication network.

In an embodiment, the UE additionally verifies it a timer is running which is intended to block the Registration procedure if not related to MUSIM and if it is so verified, the timer is disregarded and, if it is not so verified, than the Registration procedure is blocked by the UE.

In an embodiment, the timer is one of a Back Off, BO, timer, T3446, and a Service Gap Control, SGC, timer, T3447.

In an embodiment, being in a non-allowed area corresponds with the UE being in a 5GMM-REGISTERED.NON-ALLOWED-SERVICE state.

In an embodiment, the MUSIM feature is one of: Connection release, Paging Cause Indication, Reject paging request, Paging Restriction and delete stored paging restrictions information.

In an embodiment, if the UE is in a non-allowed area, then a request for a MUSIM feature is treated as a trigger for the Registration procedure.

In an embodiment, the UE is in a non-allowed area if it is located in a specifically non-allowed area or if it not located in an allowed area.

According to a second aspect of the present invention, there is provided method of operating a User Equipment, UE, with MUSIM capability, wherein if the UE encounters or receives a trigger for a Network Access Stratum, NAS procedure related to a MUSIM feature, but there is a timer running which is intended to block the NAS procedure if not related to MUSIM and if it is so verified, the timer is disregarded and the procedure is initiated, and if it is not so verified, then the NAS procedure is blocked by the UE.

In an embodiment, the NAS procedure is a Service Request procedure.

In an embodiment, the timer is one of a Back Off, BO, timer, T3446, and a Service Gap Control, SGC, timer, T3447.

In an embodiment, the MUSIM feature is one of: Connection release, Paging Cause Indication, Reject paging request, Paging Restriction and delete stored paging restrictions information.

In an embodiment, the UE is S1 and or N1 mode.

According to a third aspect of the present invention, there is provided UE operable to perform the method of any preceding aspect.

When located in a restricted service area, the UE can/should verify if the trigger for a NAS procedure is related to at least one M-USIM feature, e.g., to provide paging restrictions, or delete stored paging restrictions information etc. If the UE can make such verification, the UE determines to allow procedure and will send the necessary NAS message, such as a service request message or the Registration Request message, but not limited thereto.

When the UE has a BO timer that is running, the UE can/should verify if the trigger for a NAS procedure is related to at least one M-USIM feature, e.g., to provide paging restrictions or delete stored paging restrictions information, etc. If the UE can make such verification, the UE determines to allow procedure and will send the necessary NAS message such as the service request message, but not limited thereto. The network should not reject the NAS message from the UE, or the rejection and providing the BO timer should be considered (optionally be the UE) as implicit acceptance of removal of stored paging restrictions information at the network function (NF), e.g., the AMF.

When the UE has a running service gap control timer, the UE can/should verify if the trigger for a NAS procedure is related to at least one M-USIM feature, e.g., provide paging restrictions, etc. If the UE can make such verification, the UE determines to allow procedure and sends the necessary NAS message such as the service request message, but not limited thereto. The network should not reject the NAS message from the UE.

FIG. 1 shows a flowchart illustrating operation of a UE in a restricted service area according to an embodiment of the disclosure.

FIG. 1 illustrates steps in a NAS procedure for UE behavior. As used herein, an S1 mode refers to an evolved packet system (EPS), and an N1 mode refers to 5GS. As such, the network refers to one or more nodes such as a mobile management entity (MME) in the EPS or the AMF in 5GS. Also, the embodiments herein can be applied in any combination and in any order. For example, they can also be applied to the UE in the S1 mode, or in the N1 mode, or in both modes, as possible.

Note that throughout this application, the term "MUSIM feature" can be related to, or can refer to, any of the following: connection release (e.g. for MUSIM), paging cause indication (e.g. for MUSIM), reject paging request (e.g. for MUSIM), or paging restriction (e.g. for MUSIM), or any combination of these features.

Note that the detailed embodiments herein can be applied in any combination and in any order. They can also be applied to the UE in S1 mode (if possible) or N1 mode, or both (if possible).

Note that S1 mode may refer to EPS, and N1 mode may refer to 5GS and as such the network may refer to one or more nodes such as the MME (in EPS) or the AMF (in 5GS).

The UE verifies for a new condition based on which a service request procedure can be initiated while in a restricted service area.

A UE that is in restricted service area can mean, for example, that the UE is not located in an allowed area, or the UE is located in a non-allowed area.

The UE may be configured or pre-configured, for example, in the USIM and/or mobile equipment, or be configured by the network using any NAS signaling registration accept message, or configuration update command message, or any other NAS message that may be existing or may be newly defined, with rules regarding whether or not to allow a certain NAS procedure that is triggered by, or for the purpose of, an M-USIM feature. The configuration may be, for example, that the UE: is to allow one or more NAS procedures if the procedure is related to at least one or more, or a subset of, the M-USIM features; or is not to allow one or more NAS procedures if the procedure is related to one or more, or a subset of, the M-USIM features.

The configuration is stored in the UE until a new or updated configuration is received and thereby the UE considers a newly received configuration to be the most valid or most recent configurations. Thereby, the UE may delete and/or update any previous configured that was stored. Details of the UE being configured are explained above, and optionally regarding the UE verifying the configuration in order to determine an action, or to determine not take an action, can be applied to all the procedures detailed herein.

When the UE is located in a restricted service area, the UE may detect (or receive or be faced with) a trigger to perform a service request procedure. The UE verifies if the trigger is related to at least one M-USIM feature. If the trigger is related to at least one M-USIM feature, the UE verifies if the procedure is to be permitted or not, for example, based on a configuration that is stored in the UE, as described above.

If the UE determines, as explained above, that the UE should permit the procedure, then the UE initiates the NAS procedure and sends the necessary NAS message, for example, a Service Request message, Registration Request message, etc. The UE may do this either when in 5GMM-IDLE mode, or in the 5GMM-CONNECTED mode, or in 5GMM-CONNECTED mode with an RRC inactive indication. For example, if the UE has sent a service request message without including paging restrictions (PRs), the network should delete any stored PRs, for example, PRs in the UE's context, and send back the NAS response message, for example a service accept, a service reject or registration accept/reject message. In this case the AMF and the UE should optionally treat that the PRs are deleted at the UE and network side, and optionally that any new PR(s) that was sent by the UE is to be considered the most up to date or the most valid PR(s).

If the UE is in 5GMM-IDLE mode with suspend indication, then the UE may take the same actions, as set out above. In this case, if the UE determines to initiate a NAS procedure, for example, due to a trigger that is related to at least one M-USIM feature (and optionally if permitted based on the configurations of the UE, as explained earlier), then the UE may first request that lower layers resume the connection. The UE may then send a NAS message after the lower layers indicate that the RRC connection has been resumed.

When sending the NAS message, as described above, the UE should optionally not include the uplink data status (or optionally not include the allowed PDU session status), so as to not request the establishment of user plane (UP) resources except if the UE requires resources for an emergency PDU session or if the UE is a high priority access UE.

Similarly, the AMF should not reject a NAS message from the UE which is located in a restricted area if the NAS message contains information (e.g., one or more information elements) that is related to at least one M-USIM feature.

The steps of the procedure above can be applied in any combination or order. Moreover, a NAS message (that may be sent by the UE) can be any NAS message such as, but not limited to, a service request message, a control plane service request message, a registration request message, etc.

FIG. 1 shows, as an example, steps in a procedure for UE behavior based on the description above, without being limiting.

At step S1 of FIG. 1, the UE is determined to be located in a restricted service area and has a trigger to initiate a NAS procedure.

At step S2 of FIG. 1, the UE verifies if the trigger is related to at least one M-USIM feature. If not, at step S3 of FIG. 1, the UE blocks the procedure and returns to S1.

If in S2 of FIG. 1 the trigger is verified to be related to at least one M-USIM feature, then the UE, at step S4, allows or initiates the procedure and sends the necessary NAS message. The NAS message may be a service request procedure or, preferably, a registration procedure. Step S4 of FIG. 1 may optionally involve requesting a lower layer to resume a connection. For example, the UE may involve requesting a lower layer to resume a connection at step S4.

Note that the steps above can be arranged in any order and in any combination.

Note that for all of the procedures herein, the UE may first determine what action to take based on a configuration that is stored in the UE, where this configuration is received in the UE as described earlier. This can apply to all the procedures herein.

Optionally, when sending a NAS message in the S1 mode, for example a control plane service request (CPSR) message or a tracking area update (TAU) request message, the UE should not set any bit in the message such that the bit indicates a request to setup user plane resources. The bit may be an active flag bit and, as such, the UE should not set the bit such that the value of the bit indicates that radio bearer resources are required/requested. As such, the bit should be set to a value that indicates that no user plane resources, or no bearer resources are required/requested.

This procedure can be applied by the UE when sending the CPSR or the TAU Request message in the S1 mode. Optionally, this procedure may apply anytime the UE sends the indicated NAS message when the NAS message includes any service area list or IE that is related to an M-USIM feature, for example when the an information element (IE) of the UE request type is included and optionally when the value of the IE indicates that the NAS signaling release is required (or the value indicates a NAS signaling connection release) or the IE indicates a rejection of paging. The above procedure can always be applicable in S1 mode, without regard to being in a restricted service area.

When the UE has a running BO timer, for example, a mobility management BO timer, the UE may get or receive a request from upper layers which is a trigger for a NAS procedure, e.g., service request procedure or a registration procedure. The UE should verify if the request is related to at least one M-USIM feature. If this is the case, the UE allows the procedure and initiates the related procedure by sending the appropriate NAS message, e.g., service request message or registration request message).

The determination in the UE may be done based on a configuration of the UE, as explained earlier.

As such, if the trigger is related to at least one M-USIM feature, (optionally if the configuration in the UE allows the procedure) then the UE permits the procedure and sends the corresponding NAS message. Otherwise, the UE does not initiate the procedure (i.e., the UE blocks the procedure) if the trigger is not deemed to be an exception to the running BO timer. As such, a trigger that is related to at least one M-USIM feature should be considered by the UE (and optionally the network), to be an exception to a running BO timer. Also, the network should not reject a NAS message, for example due to congestion, when the NAS message (and/or NAS procedure) includes at least one indication or information element that is related to at least one M-USIM feature. Providing a BO timer by the UE and/or the network is to be treated as an implicit indication of a successful completion of the procedure.

For example if the UE has sent a service request message without including PRs, the network should delete any stored PRs in the UE's context and send back the NAS response message, e.g., a service accept message, a service reject message or a registration accept/reject message, in this case the AMF and the UE should delete the PRs at the UE and network side. Optionally, any new PR(s) sent by the UE is to be considered the most up to date or the most valid PR(s).

Therefore, a trigger for a service that is related to at least one M-USIM feature should be considered by the UE and/or the network (e.g., AMF) to be an exception to a running BO timer (e.g., the mobility management BO timer). Thus, the UE with a running BO timer should allow a related NAS procedure (and hence send a corresponding NAS message) when the trigger for the procedure is for at least one M-USIM feature. Similarly, the network (e.g., AMF or MME) should not reject a request from a UE that is related to at least one M-USIM feature.

The above procedure applies to a UE that operates in the S1 mode, i.e., EPS, and/or N1 mode (i.e., 5GS) and hence the network can refer to an AMF and/or an MME.

Moreover, the NAS message can be any of a service request, a CPSR, a TAU request, a registration request, or any other NAS message that is existing or that may be new and that is used in either the S1 mode or the N1 mode. The BO timer in question may be a BO timer that is related to the NAS protocol in S1 mode or the NAS protocol in N1 mode or both.

Figure 2:
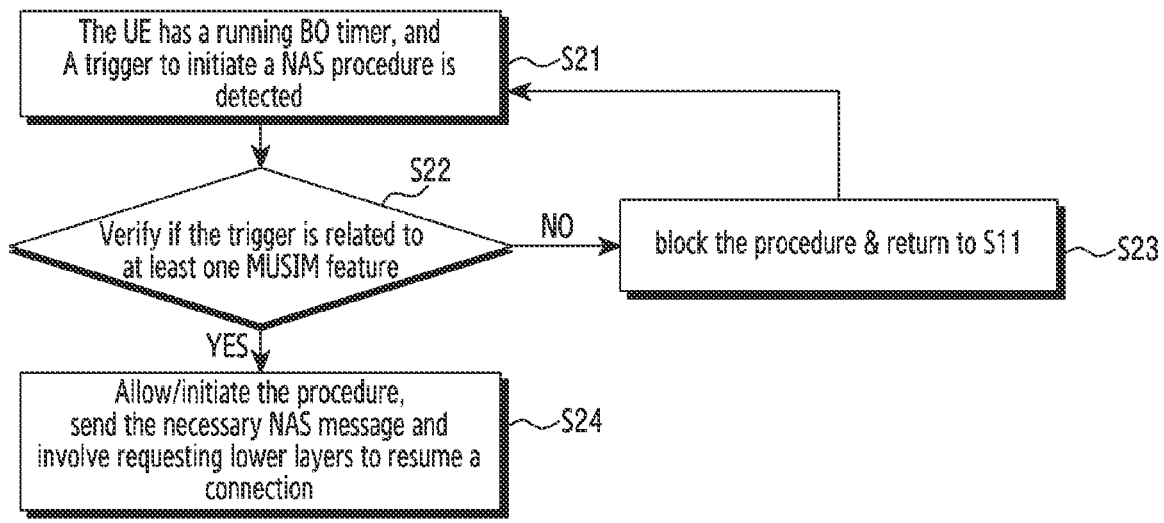
FIG. 2 illustrates a NAS procedure for UE behavior.

FIG. 2 shows a flowchart illustrating operation of a UE with a running Back Off timer according to an embodiment of the invention.

FIG. 2 illustrates steps in a NAS procedure for UE behavior.

FIG. 2 shows steps in a procedure for UE behaviour based on the description above, noting that this is an example only and not intended to be limiting.

At step S21 of FIG. 2, the UE has a running BO timer and has a trigger to initiate a NAS procedure.

At step S22 of FIG. 2, the UE verifies if the trigger is related to at least one M-USIM feature. If not, at step S23, the UE blocks the procedure and returns to step S21.

If at step S22 the UE verifies that the trigger is related to at least one M-USIM feature, then the UE, at step S24, allows or initiates the procedure and sends the necessary NAS message. Step S24 optionally involves requesting a lower layer to resume a connection.

Note that the steps above can be arranged in any order and in any combination.

Figure 3:
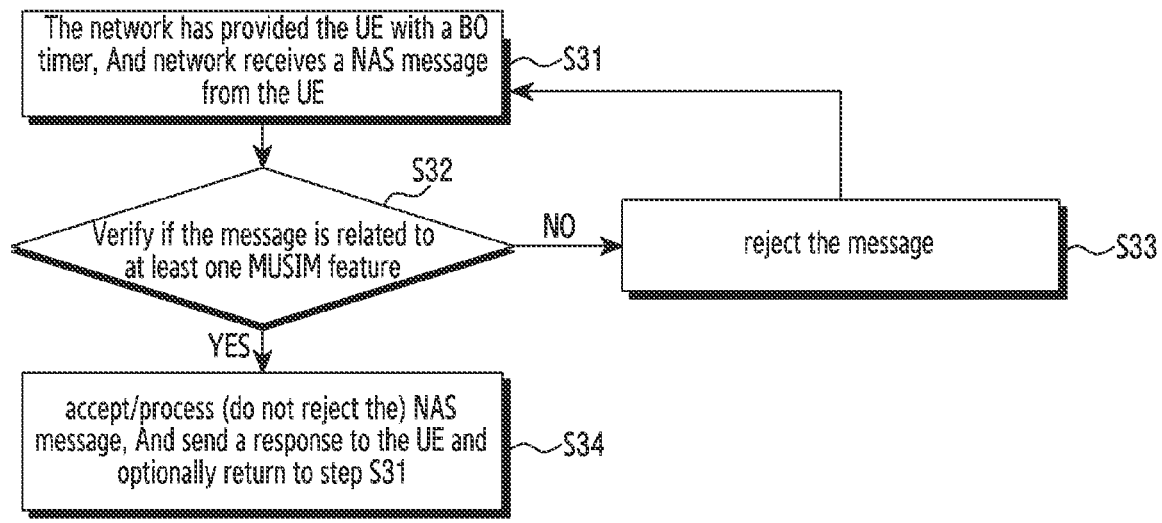
FIG. 3 is a flowchart more aligned with the network operation, where a network with a UE context has a running BO timer.

FIG. 3 shows a flowchart illustrating operation of a network (MME or AMF) with a UE context having a running BO timer according to an embodiment of the invention.

FIG. 3 illustrates a flowchart more aligned with the network operation, where the network with a UE context having a running BO timer, with the network being an MME to AMF network. In FIG. 3, the network providing a BO timer to the UE may mean that the BO timer is also running in the network.

At step S31, the network has provided the UE with a BO timer and the network receives an NAS message from the UE.

At step S32, the network verifies if the NAS message is related to at least one M-USIM feature. If not, at step S33, the network rejects the message and returns to step S31.

If at step S32 the network verifies if the NAS message is related to at least one M-USIM feature, then the network, at step S34 accepts or processes (i.e. does not reject) the NAS message and sends a response to the UE. Optionally, the process returns to step S31.

When the UE has an SGC timer (e.g., a T3447 timer) that is running, the UE may get or receive a request from upper layer which is a trigger for a NAS procedure (e.g. service request procedure or a registration procedure). The UE should verify if the request is related to at least one M-USIM feature. If this is the case, then the UE should allow the procedure (optionally after verifying a configuration in the UE as described earlier), and hence initiate the related procedure by sending the appropriate NAS message (e.g. a service request message, a registration request message, a CPSR message, etc.). As such, if the trigger is related to at least one M-USIM feature, then the UE permits the procedure and sends the corresponding NAS message. Otherwise, the UE does not initiate the procedure (e.g., the UE blocks the procedure) if the trigger is not deemed to be an exception to the running SGC timer.

As such, a trigger that is related to at least one M-USIM feature should be considered by the UE and optionally the network to be an exception to a SGC timer. Also, the network should not reject a NAS message from a UE for which there is a running SGC timer, when the NAS message (and/or NAS procedure) includes at least one indication or information element that is related to at least one M-USIM feature.

Optionally, the UE and/or the network does not start the SGC timer after the NAS connection is released (i.e. after transitioning from the 5GMM-CONNECTED mode to the 5GMM-IDLE mode in the N1 mode, or from an EPS mobility management (EMM)-CONNECTED mode to an EMM-IDLE mode in the S1 mode) if the NAS connection with a the NAS message that was sent by the UE such that the message included any information and/or indication that is related to at least one M-USIM feature.

The procedures set out above applies to a UE that operates in the S1 mode (i.e., EPS) and/or in the N1 mode (i.e., 5GS). Hence, the network can be referred to as an AMF and/or an MME.

The NAS message can be any of a service request, a CPSR, a TAU request, an Attach Request, a Registration Request, or any other NAS message that is existing or that may be new and that is used in either S1 mode or N1 mode. The SGC timer may be a timer that is related to the NAS protocol in the S1 mode, the NAS protocol in the N1 mode, or both.

FIGS. 2 and 3 can also be applicable for the UE and the network, respectively, as described above, where for example the BO timer can be replaced with the SGC timer.

Figure 4:
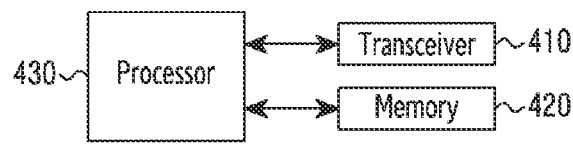
FIG. 4 illustrates a structure of a UE according to an embodiment.

FIG. 4 illustrates a structure of a UE according to an embodiment.

As shown in FIG. 4, the UE may include a transceiver 410, a memory 420, and a processor 430. The transceiver 410, the memory 420, and the processor 430 of the UE may operate according to a communication method of the UE described above. However, the components of the UE are not limited thereto. For example, the UE may include more or fewer components than those described above. In addition, the processor 430, the transceiver 410, and the memory 420 may be implemented as a single chip. Also, the processor 430 may include at least one processor. Furthermore, the UE of FIG. 4 corresponds to the UE of the FIGS. 1 to 3.

The transceiver 410 collectively refers to a UE receiver and a UE transmitter, and may transmit/receive a signal to/from a base station or a network entity. The signal transmitted or received to or from the base station or a network entity may include control information and data. The transceiver 410 may include a RF transmitter for up-converting and amplifying a frequency of a transmitted signal, and a RF receiver for amplifying low-noise and down-converting a frequency of a received signal. However, this is only an example of the transceiver 410 and components of the transceiver 410 are not limited to the RF transmitter and the RF receiver.

Also, the transceiver 410 may receive and output, to the processor 430, a signal through a wireless channel, and transmit a signal output from the processor 430 through the wireless channel.

The memory 420 may store a program and data required for operations of the UE. Also, the memory 420 may store control information or data included in a signal obtained by the UE. The memory 420 may be a storage medium, such as ROM, RAM, a hard disk, a CD-ROM, and a DVD, or a combination of storage media.

The processor 430 may control a series of processes such that the UE operates as described above. For example, the transceiver 410 may receive a data signal including a control signal transmitted by the base station or the network entity, and the processor 430 may determine a result of receiving the control signal and the data signal transmitted by the base station or the network entity.

Figure 5:
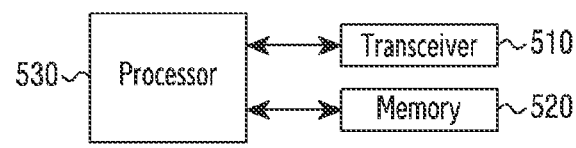
FIG. 5 illustrates a structure of a base station according to an embodiment.

FIG. 5 illustrates a structure of a base station according to an embodiment.

As shown in FIG. 5, the base station may include a transceiver 510, a memory 520, and a processor 530. The transceiver 510, the memory 520, and the processor 530 of the base station may operate according to a communication method of the base station described above. However, the components of the base station are not limited thereto. For example, the base station may include more or fewer components than those described above. In addition, the processor 530, the transceiver 510, and the memory 520 may be implemented as a single chip. Also, the processor 530 may include at least one processor. Furthermore, the base station of FIG. 5 corresponds to the BS of the FIGS. 1 to 3.

The transceiver 510 collectively refers to a base station receiver and a base station transmitter, and may transmit/receive a signal to/from a terminal (UE) or a network entity. The signal transmitted or received to or from the terminal or a network entity may include control information and data. The transceiver 510 may include a RF transmitter for up-converting and amplifying a frequency of a transmitted signal, and a RF receiver for amplifying low-noise and down-converting a frequency of a received signal. However, this is only an example of the transceiver 510 and components of the transceiver 510 are not limited to the RF transmitter and the RF receiver.

Also, the transceiver 510 may receive and output, to the processor 530, a signal through a wireless channel, and transmit a signal output from the processor 530 through the wireless channel.

The memory 520 may store a program and data required for operations of the base station. Also, the memory 520 may store control information or data included in a signal obtained by the base station. The memory 520 may be a storage medium, such as ROM, RAM, a hard disk, a CD-ROM, and a DVD, or a combination of storage media.

The processor 530 may control a series of processes such that the base station operates as described above. For example, the transceiver 510 may receive a data signal including a control signal transmitted by the terminal, and the processor 530 may determine a result of receiving the control signal and the data signal transmitted by the terminal.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. A method performed by a user equipment (UE) in a wireless communication system, the method comprising:
   identifying that a mobility management back off (BO) timer is running;
   identifying that the UE supporting a multi-universal subscriber identity module (MUSIM) is in an evolved packet system (EPS) mobility management (EMM)-connected mode or a fifth generation system (5GS) mobility management (5GMM)-connected mode, and the UE is to transmit a first non-access stratum (NAS) message; and
   starting a first service request procedure to transmit the first NAS message for requesting a network entity for managing mobility to release a connection while the mobility management BO timer is running.

2. The method of claim 1, further comprising:
   identifying that a service gap control (SGC) timer is running;
   identifying that the UE supporting the MUSIM is in the EMM-connected mode, and the UE is to transmit a second NAS message to the network entity; and
   starting a second service request procedure to transmit the second NAS message to the network entity while the SGC timer is running.

3. The method of claim 1, further comprising:
   identifying that a service gap control (SGC) timer is running;
   identifying that the UE supporting the MUSIM is in the 5GMM-connected mode with a radio resource control (RRC) inactive indication, and the UE is to transmit a second NAS message to the network entity; and
   starting a second service request procedure to transmit the second NAS message to the network entity while the SGC timer is running.

4. The method of claim 1, further comprising:
   receiving, from the network entity via a base station, service area restriction information including information on a non-allowed area; and
   transmitting, to the network entity via the base station, a registration request for removing a paging restriction, based on removal of the paging restriction being required while the UE supporting the MUSIM is in a state in which a cell the UE camps on is in the non-allowed area.

5. A user equipment (UE) in a wireless communication system, the UE comprising:
   a transceiver; and
   a controller coupled with the transceiver and configured to:
   identify that a mobility management back off (BO) timer is running,
   identify that the UE supporting a multi-universal subscriber identity module (MUSIM) is in an evolved packet system (EPS) mobility management (EMM)-connected mode or a fifth generation system (5GS) mobility management (5GMM)-connected mode, and the UE is to transmit a first non-access stratum (NAS) message, and start a first service request procedure to transmit the first NAS message for requesting a network entity for managing mobility to release a connection while the mobility management BO timer is running.

6. The UE of claim 5, wherein the controller is further configured to:

identify that a service gap control (SGC) timer is running, identify that the UE supporting the MUSIM is in the EMM-connected mode, and the UE is to transmit a second NAS message to the network entity, and start a second service request procedure to transmit the second NAS message to the network entity while the SGC timer is running.

7. The UE of claim 5, wherein the controller is further configured to:

identify that a service gap control (SGC) timer is running, identify that the UE supporting the MUSIM is in the 5GMM-connected mode with a radio resource control (RRC) inactive indication, and the UE is to transmit a second NAS message to the network entity, and start a second service request procedure to transmit the second NAS message to the network entity while the SGC timer is running.

8. The UE of claim 5, wherein the controller is further configured to:

receive, from the network entity via a base station, service area restriction information including information on a non-allowed area, and transmit, to the network entity via the base station, a registration request for removing a paging restriction, based on removal of the paging restriction being required while the UE supporting the MUSIM is in a state in which a cell the UE camps on is in the non-allowed area.

9. A method performed by a network entity for managing mobility in a wireless communication system, the method comprising:

receiving, from a user equipment (UE) while a mobility management back off (BO) timer is running, a first non-access stratum (NAS) message associated with a first service request procedure for a release of a connection, based on the UE supporting a multi-universal subscriber identity module (MUSIM) being in an evolved packet system (EPS) mobility management (EMM)-connected mode or a fifth generation system (5GS) mobility management (5GMM)-connected mode; and transmitting a message as a response to the first NAS message.

10. The method of claim 9, wherein a second service request procedure starts while a service gap control (SGC) timer is running, based on a second NAS message associated with the second service request procedure being received from the UE, and based on the UE supporting the MUSIM being in the EMM-connected mode.

11. The method of claim 9, wherein a second service request procedure starts while a service gap control (SGC) timer is running, based on a second NAS message associated with the second service request procedure being received from the UE, and based on the UE supporting the MUSIM being in the 5GMM-connected mode with a radio resource control (RRC) inactive indication.

12. The method of claim 9, further comprising:

transmitting, to the UE via a base station, service area restriction information including information on a non-allowed area; and receiving, from the UE via the base station, a registration request for removing a paging restriction, based on removal of the paging restriction being required while the UE supporting the MUSIM is in a state in which a cell the UE camps on is in the non-allowed area.

13. A network entity for managing mobility in a wireless communication system, the network entity comprising:

a transceiver; and a controller coupled with the transceiver and configured to:

receive, from a user equipment (UE) while a mobility management back off (BO) timer is running, a first non-access stratum (NAS) message associated with a first service request procedure for a release of a connection, based on the UE supporting a multi-universal subscriber identity module (MUSIM) being in an evolved packet system (EPS) mobility management (EMM)-connected mode or a fifth generation system (5GS) mobility management (5GMM)-connected mode, and transmit a message as a response to the first NAS message.

14. The network entity of claim 13, wherein a second service request procedure starts while a service gap control (SGC) timer is running, based on a second NAS message associated with the second service request procedure being received from the UE, and based on the UE supporting the MUSIM being in the EMM-connected mode.

15. The network entity of claim 13, wherein a second service request procedure starts while a service gap control (SGC) timer is running, based on a second NAS message associated with the second service request procedure being received from the UE, and based on the UE supporting the MUSIM being in the 5GMM-connected mode with a radio resource control (RRC) inactive indication.

16. The network entity of claim 13, wherein the controller is further configured to:

transmit, to the UE via a base station, service area restriction information including information on a non-allowed area, and receive, from the UE via the base station, a registration request for removing a paging restriction, based on removal of the paging restriction being required while the UE supporting the MUSIM is in a state in which a cell the UE camps on is in the non-allowed area.

* * * * *